(12) United States Patent
Yan (10) Patent No.: US 11,988,498 B2
(45) Date of Patent: May 21, 2024

(54) DETECTION DEVICE AND POLE PIECE MANUFACTURING EQUIPMENT

(71) Applicant: CONTEMPORARY AMPEREX TECHNOLOGY CO., LIMITED, Ningde (CN)

(72) Inventor: Liangjie Yan, Ningde (CN)

(73) Assignee: CONTEMPORARY AMPEREX TECHNOLOGY CO., LIMITED, Ningde (CN)

( * ) Notice: Subject to any disclaimer, the term of this patent is extended or adjusted under 35 U.S.C. 154(b) by 0 days.

(21) Appl. No.: 18/199,868

(22) Filed: May 19, 2023

(65) Prior Publication Data

US 2023/0288190 A1 Sep. 14, 2023

Related U.S. Application Data

(63) Continuation of application No. PCT/CN2022/082166, filed on Mar. 22, 2022.

(30) Foreign Application Priority Data

Feb. 17, 2022 (CN) .......................... 202220322938.5

(51) Int. Cl.
*G01B 11/06* (2006.01)
*B05C 21/00* (2006.01)
(Continued)

(52) U.S. Cl.
CPC .......... *G01B 11/0625* (2013.01); *B05C 21/00* (2013.01); *G01S 7/4813* (2013.01); *G01S 17/08* (2013.01)

(58) Field of Classification Search
None
See application file for complete search history.

(56) References Cited

U.S. PATENT DOCUMENTS 10,219,325 B2 * 2/2019 Li ....................... G01B 11/0625
11,029,713 B2 * 6/2021 Haven .................. G01D 11/245
(Continued)

FOREIGN PATENT DOCUMENTS

CN 105403142 A 3/2016
CN 110252593 A 9/2019
(Continued)

OTHER PUBLICATIONS

International Search Report issued Aug. 29, 2022 in International Patent Application No. PCT/CN2022/082166 (An English translation only is submitted herewith. An original-language copy was previously submitted on May 19, 2023. No new information is added.).

(Continued)

*Primary Examiner* — Jethro M. Pence
(74) *Attorney, Agent, or Firm* — XSENSUS LLP (57) ABSTRACT

The present application provides a detection device and pole piece manufacturing equipment. The detection device includes: a laser ranging sensor; and a cooling module, which includes a first protective enclosure and a cooling plate, where the first protective enclosure encloses the outside of the laser ranging sensor; the first protective enclosure is provided with an avoidance portion for avoiding a laser light path of the laser ranging sensor; the first protective enclosure has a first opening; the cooling plate covers the first opening; an air flow channel is defined inside the cooling plate; surfaces of the cooling plate are provided with air inlet holes and first air outlet holes which are communicated with the air flow channel; and the first air outlet holes are disposed in a manner of facing the laser ranging sensor to blow air to the laser ranging sensor to cool the laser ranging sensor.

15 Claims, 8 Drawing Sheets

(51) Int. Cl.
    *G01S 7/481*         (2006.01)
    *G01S 17/08*        (2006.01)

(56) References Cited

U.S. PATENT DOCUMENTS

| | | | |
|---|---|---|---|
| 11,231,171 B2 * | 1/2022 | Van Straten | F21S 45/60 |
| 11,490,466 B2 * | 11/2022 | Li | G01B 11/0625 |
| 11,629,920 B2 * | 4/2023 | Cao | B62D 63/04 |
| | | | 73/866.5 |
| 11,740,139 B2 * | 8/2023 | Gao | G01K 15/002 |
| | | | 374/1 |
| 2009/0046752 A1 | 2/2009 | Bueche et al. | |
| 2022/0057489 A1 * | 2/2022 | Zhou | G01S 17/08 |
| 2022/0107394 A1 * | 4/2022 | Li | G01S 7/4813 |
| 2022/0171028 A1 * | 6/2022 | Hou | G01S 7/4813 |
| 2022/0390603 A1 * | 12/2022 | Wang | G01S 17/87 |
| 2023/0139573 A1 * | 5/2023 | Takai | G01B 11/24 |
| | | | 356/601 |

FOREIGN PATENT DOCUMENTS

| | | | | |
|---|---|---|---|---|
| CN | 110518441 A | | 11/2019 | |
| CN | 211375052 U | * | 8/2020 | G01S 7/481 |
| CN | 211375052 U | | 8/2020 | |
| JP | 2016080629 A | | 5/2016 | |

OTHER PUBLICATIONS

Partial Supplementary European Search Report issued Feb. 1, 2024 in European Patent Application No. 22888630.5, 11 pages.

* cited by examiner

DETECTION DEVICE AND POLE PIECE MANUFACTURING EQUIPMENT

CROSS-REFERENCE TO RELATED APPLICATIONS

The present application is a continuation of PCT Patent Application No. PCT/CN2022/082166, entitled "DETECTION DEVICE AND POLE PIECE MANUFACTURING EQUIPMENT" filed on Mar. 22, 2022, which claims the priority of Chinese Patent Application No. 202220322938.5 filed on Feb. 17, 2022 and entitled "DETECTION DEVICE AND POLE PIECE MANUFACTURING EQUIPMENT", the entire contents of which are incorporated herein by reference.

TECHNICAL FIELD

The present application relates to the technical field of battery manufacturing, and in particular, to a detection device and pole piece manufacturing equipment.

BACKGROUND

In the related art, in a manufacturing process of a pole piece of a battery, a detection device will be used to detect the thickness of the pole piece, so as to ensure the forming quality of the pole piece of the battery. However, when a working environment of the detection device has a high temperature and the detection device is used for continuous detection, the temperature of the detection device will continue to rise. A too high temperature will cause the detection accuracy of the detection device to decrease, and may even damage the detection device.

SUMMARY OF THE INVENTION

An objective of embodiments of the present application is to provide a detection device, which can effectively cool a laser ranging sensor, so as to improve the detection accuracy and use safety of the laser ranging sensor.

Another objective of the embodiments of the present application is to provide pole piece manufacturing equipment including the above detection device.

According to a first aspect, the embodiments of the present application provide a detection device, including: a laser ranging sensor; and a cooling module, which includes a first protective enclosure and a cooling plate, where the first protective enclosure encloses the outside of the laser ranging sensor; the first protective enclosure is provided with an avoidance portion for avoiding a laser light path of the laser ranging sensor; the first protective enclosure has a first opening; the cooling plate covers the first opening; an air flow channel is defined inside the cooling plate; surfaces of the cooling plate are provided with air inlet holes and first air outlet holes which are communicated with the air flow channel; and the first air outlet holes are disposed in a manner of facing the laser ranging sensor to blow air to the laser ranging sensor to cool the laser ranging sensor.

In the above embodiment, the detection device includes the laser ranging sensor and the cooling module. The cooling module includes the first protective enclosure and the cooling plate; the first protective enclosure encloses the outside of the laser ranging sensor; the first protective enclosure has the first opening; the cooling plate covers the first opening, so that the laser ranging sensor is located between the first protective enclosure and the cooling plate. Specifically, the air flow channel is defined inside the cooling plate, and the surface of the cooling plate is provided with the air inlet holes and the first air outlet holes which are communicated with the air flow channel; and the first air outlet holes are disposed in a manner of facing the laser ranging sensor. In this way, when compressed air is introduced into the air inlet holes, the compressed air can be blown from the air outlet holes to the laser ranging sensor after passing through the air flow channel. By means of exchanging heat with hot air in an environment where the laser ranging sensor is located, the compressed air achieves the purpose of cooling the laser ranging sensor. Thus, it helps to improve the detection accuracy of the laser ranging sensor, and prolongs the service life of the laser ranging sensor.

In some embodiments, the cooling plate includes a first surface and a second surface which are disposed adjacently; the first surface is disposed in a manner of facing the laser ranging sensor; the first air outlet holes are formed in the first surface; and the air inlet holes are formed in the second surface.

In the above embodiment, the first surface and the second surface of the cooling plate are arranged adjacently, and the first surface faces the laser ranging sensor; the first air outlet holes and the air inlet holes are respectively formed in the first surface and the second surface. That is, the second surface can be any one of four surfaces adjacent to the first surface. That is, the air inlet holes are formed in any one of the four surfaces adjacent to the first surface.

In some embodiments, there are multiple air flow channels, which are arranged at intervals inside the cooling plate.

In the above embodiment, by means of arranging the multiple air flow channels at intervals inside the cooling plate, the number of the air flow channel is increased, thereby increasing a flow area of the compressed air in the cooling plate, which in turn helps to improve the cooling effect on the laser ranging sensor.

In some embodiments, each of the air flow channels has multiple first air outlet holes arranged at intervals along an extending direction of the air flow channel.

In the above embodiment, by means of arranging the multiple first air outlet holes at intervals along the extending direction of each of the air flow channels, the volume of the compressed air blown to the laser ranging sensor at the same time can be increased, so as to effectively improve the heat exchange efficiency with hot air surrounding the laser ranging sensor, which can in turn improve the cooling effect on the laser ranging sensor.

In some embodiments, a side of the cooling plate facing the laser ranging sensor is provided with a position-limit slot, and part of the laser ranging sensor is embedded in the position-limit slot and is fixedly connected with the cooling plate.

In the above embodiment, by means of arranging the position-limit slot on the side of the cooling plate facing the laser ranging sensor, art of the laser ranging sensor is embedded in the position-limit slot and is fixedly connected with the cooling plate, the position-limit slot has a limiting effect on the laser ranging sensor, which prevents a relative movement of the laser ranging sensor from the cooling plate, improves the reliability of assembling of the laser ranging sensor and the cooling plate, and helps to improve the detection accuracy of the laser ranging sensor.

In some embodiments, there is a first space between the laser ranging sensor and the bottom wall of the position-limit slot, and two side walls of the position-limit slot are provided with the first air outlet holes.

In the above embodiment, by means of defining the first space between the side of the laser ranging sensor facing the cooling plate and the bottom wall of the position-limit slot, it can be ensured that the compressed air can be blown out from the first space while it is blown out from the first air outlet holes to the laser ranging sensor, which ensures the smoothness of air flowing, and in turn ensures that the compressed air can be continuously blown out from the first air outlet holes to continuously cool the laser ranging sensor. At the same time, since the two side walls of the position-limit slot are provided with the first air outlet holes, in this way, when part of the laser ranging sensor is embedded in the position-limit slot, the first air outlet holes on the two side walls of two sides of the position-limit slot can synchronously blow air to side surfaces of the laser ranging sensor, so as to further improve the cooling efficiency for the laser ranging sensor.

In some embodiments, the first protective enclosure is provided with a second opening, and the second opening is configured for connecting the laser ranging sensor with external equipment.

In the above embodiment, by means of forming the second opening in the first protective enclosure, it can be ensured that a connecting end of a laser emitting end of the laser ranging sensor is connected to the external equipment (such as a power supply device or a power supply cable), which ensures the normal use of the laser ranging sensor.

In some embodiments, the first protective enclosure is provided with an air outlet.

In the above embodiment, the first protective enclosure is provided with the air outlet. In this way, after the compressed air in the cooling plate exchanges heat with the hot air surrounding the laser ranging sensor, the compressed air can be quickly discharged out of the first protective enclosure from the air outlet, so as to ensure that the compressed air cyclically cools the laser ranging sensor in the first protective enclosure, thereby helping to further improve the cooling efficiency of the laser ranging sensor. Meanwhile, the position of the laser emitting end of the laser ranging sensor corresponds to the position of the air outlet, and the laser emitting end of the laser ranging sensor can emit laser light out of the first protective enclosure from the air outlet, thereby achieving ranging on an object to be detected.

In some embodiments, a second space for air to flow is formed between the inner wall surface of the first protective enclosure and the laser ranging sensor.

In the above embodiment, the second space is arranged between the laser ranging sensor and the inner wall surface of the first protective enclosure, so that the compressed air can form a vortex effect in the first protective enclosure after being blown from the first air outlet holes to the laser ranging sensor, which can cool all the surfaces of the laser ranging sensor and in turn further improve the cooling effect on the laser ranging sensor.

In some embodiments, each of the air flow channels has multiple second air outlet holes arranged at intervals along an extending direction of the air flow channel.

In the above-mentioned embodiment, the number of the second air outlet hole is increased, and the volume of air blown to the second protective enclosure is increased, thereby helping to improve the cooling effect on the cooling module and further improving the cooling efficiency of the laser ranging sensor.

In some embodiments, the detection device further includes: a second protective enclosure, which encloses the outside of the laser ranging sensor and the cooling module; the side of the cooling plate facing away from the laser ranging sensor is provided with second air outlet holes; the second air outlet holes are communicated with the air flow channel, and a third space for air to flow is formed between the inner wall surface of the second protective enclosure and the cooling module.

In the above embodiment, the side of the cooling plate facing away from the laser ranging sensor is provided with the second air outlet hole communicated with the air flow channel; the detection device also includes the second protective enclosure encloses the outside of the laser ranging sensor and the cooling module; and the third space is arranged between the inner wall surface of the second protective enclosure and the cooling module. In this way, when the compressed air is blown from the second air outlet hole to the inner wall surface of the second protective enclosure, a vortex effect can be formed in the second protective enclosure, so as to cool the cooling module, thereby further improving the cooling effect on the laser ranging sensor.

According to a second aspect, the embodiments of the present application provide pole piece manufacturing equipment, including: a coating device configured for coating a surface of a pole piece; the detection device according to any one of the embodiments of the first aspect, where the number of the detection devices is two, and the two detection devices are respectively arranged on two sides of the pole piece along the thickness direction and are configured for detecting the thickness of the pole piece; and a controller, which is configured for receiving the thickness of the pole piece detected by the detection devices and controlling, according to a comparison result between the thickness of the pole piece and a preset thickness threshold, the coating device to adjust the thickness of the pole piece.

In the above embodiment, the pole piece manufacturing equipment includes the coating device, the controller, and the detection devices according to any one of the embodiments of the first aspect. The coating device is configured for coating the surface of the pole piece. The detection devices are arranged on the two sides of the pole piece along the thickness direction to detect the thickness of the pole piece. The controller (such as an industrial personal computer) is electrically connected with the detection devices and the coating device, and is configured for receiving the thickness of the pole piece detected by the detection devices, comparing the thickness of the pole piece with the preset thickness threshold, and controlling, according to the comparison result, the coating device to adjust the thickness of the pole piece, so that the thickness of the pole piece reaches the preset threshold, which ensures the consistency in the thickness of the pole piece and improves the performance of a battery.

In some embodiments, the thickness of the pole piece includes a thickness of a thinned region of the pole piece.

In the above embodiment, when the thinned region of the pole piece is relatively wide during coating production, the coating amount of slurry of the pole piece is less than that of a normal region, which leads to a decrease in a battery capacity of a lithium battery, resulting in a decrease in the safety of a cell. When the thinned region of the pole piece is too narrow or there is no thinned region, a problem of bulging will occur. Therefore, by means of real-time online measurement and monitoring of the thickness of the thinned region of the pole piece, the battery capacity of the lithium battery can be effectively guaranteed, and the safety of use of the lithium battery is guaranteed.

In some embodiments, the pole piece manufacturing equipment further includes: an oven drying device, which is arranged downstream of the coating device and is configured for oven-drying the pole piece; and a rolling device, which is arranged downstream of the oven drying device and is configured for rolling the pole piece, where the detection devices are arranged upstream of the rolling device.

In the above embodiment, the pole piece manufacturing equipment further includes the oven drying device and the rolling device. The oven drying device is arranged downstream of the coating device, and is configured for oven-drying the pole piece after the coating device is used to coat the pole piece. The rolling device is arranged downstream of the oven drying device, and is configured for rolling the pole piece after the oven drying device dries the pole piece. The thickness of the pole piece rolled by the rolling device is a real-time thickness of the pole piece in an offline coating process; the thickness of the pole piece during the coating cannot be adjusted in real time; and there is a risk of batch scrapping of pole pieces due to overspecification caused by lagging detection of the thickness of the pole piece. Therefore, the detection devices are arranged upstream of the rolling device, that is, no matter the detection devices are arranged between the oven drying device and the rolling device or arranged upstream of the oven drying device, the thickness of the pole piece can be detected in real time after the coating device is used to coat the pole piece, and is adjusted in real time by the coating device, thus ensuring the reliability of the quality of the pole piece.

In some embodiments, the pole piece manufacturing equipment further includes: a base; a scanning frame, which is arranged on the base and slidably connected with the base, where the detection devices are arranged on the scanning frame; a magnetoscale assembly, which includes a magnetoscale arranged on the base and a magnetoscale reading head arranged on the scanning frame, and the magnetoscale reading head is configured for reading, when the scanning frame slides relative to the base, equally spaced magnetic waves pre-recorded on the magnetoscale, so as to detect a linear displacement of the scanning frame.

In the above embodiment, the pole piece manufacturing equipment further includes the base, the scanning frame and the magnetoscale assembly. The scanning frame is arranged on the base and is slidably connected with the base. The detection devices are arranged on the scanning frame, and the scanning frame can drive the detection devices to reciprocate to detect the thickness of the pole piece. The magnetoscale assembly includes the magnetoscale on the base and the magnetoscale reading head arranged on the scanning frame. When the scanning frame slides in a reciprocating manner relative to the base to drive the detection devices to move, the magnetoscale reading head reads the equally spaced magnetic waves pre-recorded on the magnetoscale, so as to detect the linear displacement of the scanning frame. A deviation in an edge finding position of a scanning chamber of the scanning frame caused by low accuracy of a mechanical transmission member is avoided, and the edge finding accuracy of forward and backward scanning of the laser ranging sensor when the scanning frame reciprocates is improved, thereby improving the linear measurement accuracy.

In some embodiments, the pole piece manufacturing equipment further includes a first check piece and a second check piece; the first check piece and the second check piece are arranged on the base and are respectively located on two sides of the pole piece in the width direction; one of the first check piece and the second check piece is configured for compensating the temperature of the pole piece, and the other one is configured for calibrating the temperature after compensation.

In the above embodiment, the first check piece and the second check piece connected with the first check piece by a half-bridge are arranged on the base, and the first check piece and the second check piece are respectively located on the two sides of the pole piece in the width direction; one of the first check piece and the second check piece can compensate the temperature of the pole piece after the air check and comparison, and the other one can calibrate the temperature after compensation, thereby avoiding the impact of the temperature on the detection of the thickness of the pole piece, which helps to improve the accuracy of detection of the thickness of the pole piece.

The above descriptions are only a summary of the technical solutions of the present application. In order to be able to understand the technical means of the present application more clearly, the technical means can be implemented according to the content of the specification. Furthermore, in order to make the above and other objectives, features and advantages of the present application more comprehensible, specific implementations of the present application are exemplified below.

DESCRIPTION OF DRAWINGS

In order to illustrate the technical solutions of the embodiments of the present application more clearly, the following briefly introduces the accompanying drawings required in the embodiments of the present application. Obviously, the accompanying drawings described below are only some embodiments of the present application. Those of ordinary skill in the art can also obtain other drawings according to the drawings without any creative work.

The drawings are not drawn to an actual scale.

Explanation of the numerals: detection device 100, pole piece manufacturing equipment 200; pole piece 300;

laser ranging sensor 11, cooling plate 12, first protective enclosure 13;

first space 111, air inlet hole 121, first air outlet hole 122, air flow channel 123, position-limit slot 124;

first opening 131, second opening 132, air outlet 133, second space 134, avoidance portion 135;

base 201, scanning frame 202, rolling device 203, magnetoscale assembly 204, controller 205, first check piece 206, second check piece 207;

magnetoscale 2041, magnetoscale reading head 2042.

DETAILED DESCRIPTION

The implementations of the present application will be further described in detail below with reference to the drawings and embodiments. The following detailed description of the embodiments and the drawings are used to illustrate the principles of the present application by way of example, but should not be used to limit the scope of the present application, that is, the present application is not limited to the described embodiments.

In the description of the present application, it should be noted that, unless otherwise stated, "plurality" means two or more. The orientation or positional relationships indicated by the terms "upper", "lower", "left", "right", "inner" and "outer" are only for facilitating the description of the present application and simplifying the description, rather than indicating or implying that the apparatus or element referred to must have a particular orientation or be constructed and operated in a particular orientation, and therefore will not be interpreted as limiting the present application. In addition, the terms "first", "second" and "third" are only for the purpose of description, and may not be understood as indicating or implying the relative importance. "Vertical" is not strictly vertical, but within an allowable range of an error. "Parallel" is not strictly parallel, but within an allowable range of an error.

The orientation words appearing in the following descriptions are directions shown in the figures, and do not limit the specific structure of the present application. In the description of the present application, it should be noted that the terms "mount", "connect" and "connection" should be understood in a broad sense, unless otherwise explicitly specified or defined. For example, it may be a fixed connection, a detachable connection, an integrated connection, a direct connection or an indirect connection through an intermediate medium. Those of ordinary skill in the art can understand the specific meanings of the above terms in the present application according to specific situations.

With an increasing market demand for power batteries, higher requirements are put forward on the electrical performance and safety performance of a battery. In order to improve the electrical performance and safety performance of a battery, technicians seek improvements from various aspects. The thickness of a pole piece of an electrode assembly in a battery manufacturing process has great impact on the forming quality of the pole piece of the battery, so it is necessary to detect the thickness of the pole piece of the electrode assembly in real time.

There are many methods to detect the thickness of the pole piece of the electrode assembly, such as a micrometer measurement method and a laser measurement method. Due to manual measurement, the micrometer measurement method has a large measurement error. The laser measurement method can realize automatic detection of the thickness of the pole piece of the electrode assembly, and has high measurement accuracy, so this method is widely used in an automatic production line of battery manufacturing.

The inventors have found that when the laser measurement method is used, since an infrared light sensitive element in a laser ranging sensor will expand or contract due to the impact of an ambient temperature, a corresponding range will be increased or decreased, so the detection accuracy of the laser ranging sensor is greatly affected by the ambient temperature. Particularly, when a working environment where the laser ranging sensor has a high temperature, and the laser ranging sensor is used for continuous detection, the temperature of an electrical measurement element in the laser sensor will continue to rise, thus leading to a decrease in the detection accuracy of the laser ranging sensor and even causing damage to the laser ranging sensor.

Based on this, in order to solve the problem that the laser ranging sensor has reduced detection accuracy or is even damaged due to the temperature of the environment where the laser ranging sensor is located or the continuous detection, the inventors have conducted a deep research and designed a detection device that uses a cooling module to perform real-time heat exchange cooling on the laser ranging sensor, thereby effectively improving the detection accuracy of the laser ranging sensor and avoiding the damage to the laser ranging sensor due to an extremely high ambient temperature.

A detection device disclosed in the embodiments of the present application can be used, but not limited to, in pole piece manufacturing equipment, steelmaking equipment and other sets of equipment.

Figure 1:
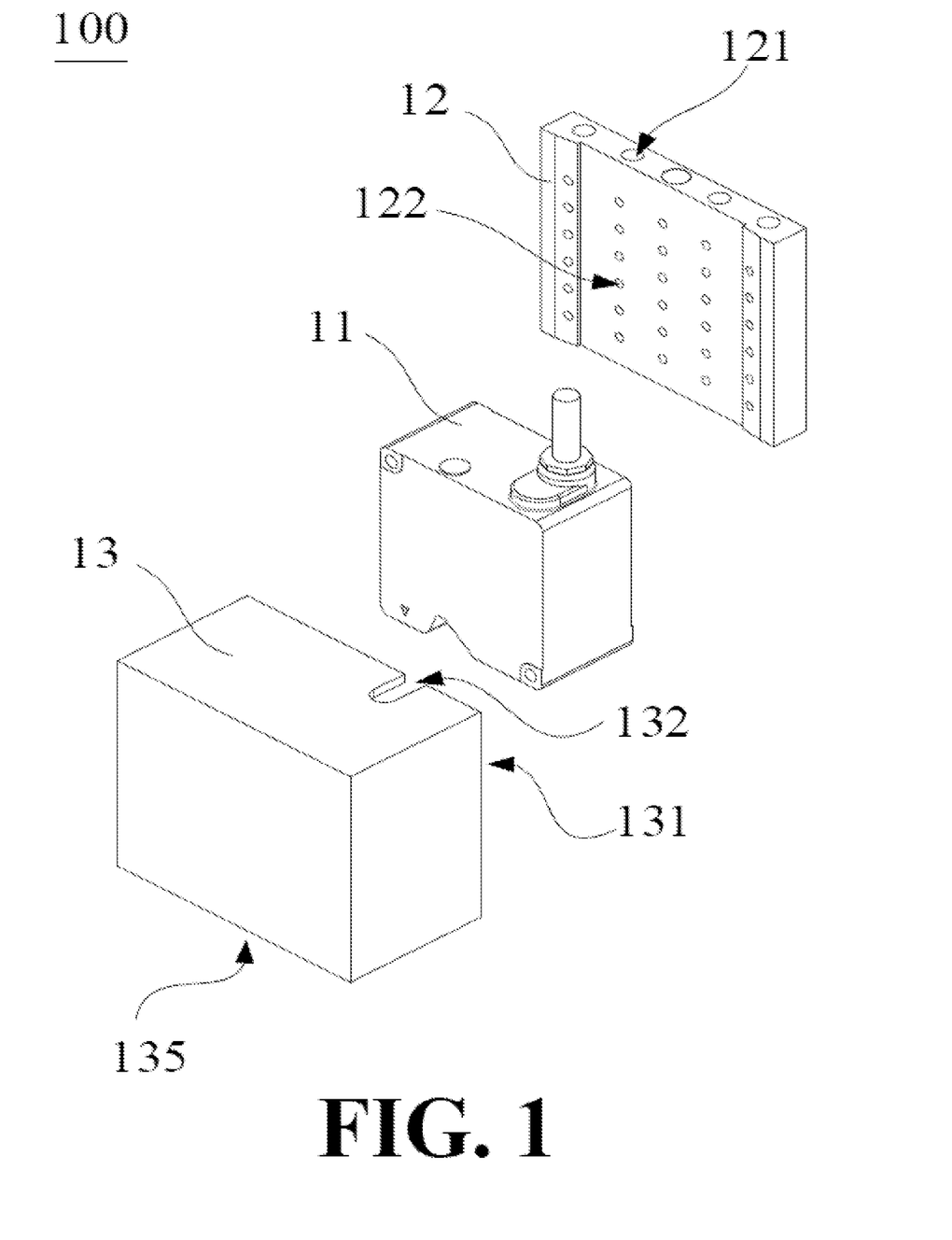
FIG. 1 is a schematic exploded structural diagram of a detection device provided in some embodiments of the present application.
Figure 2:
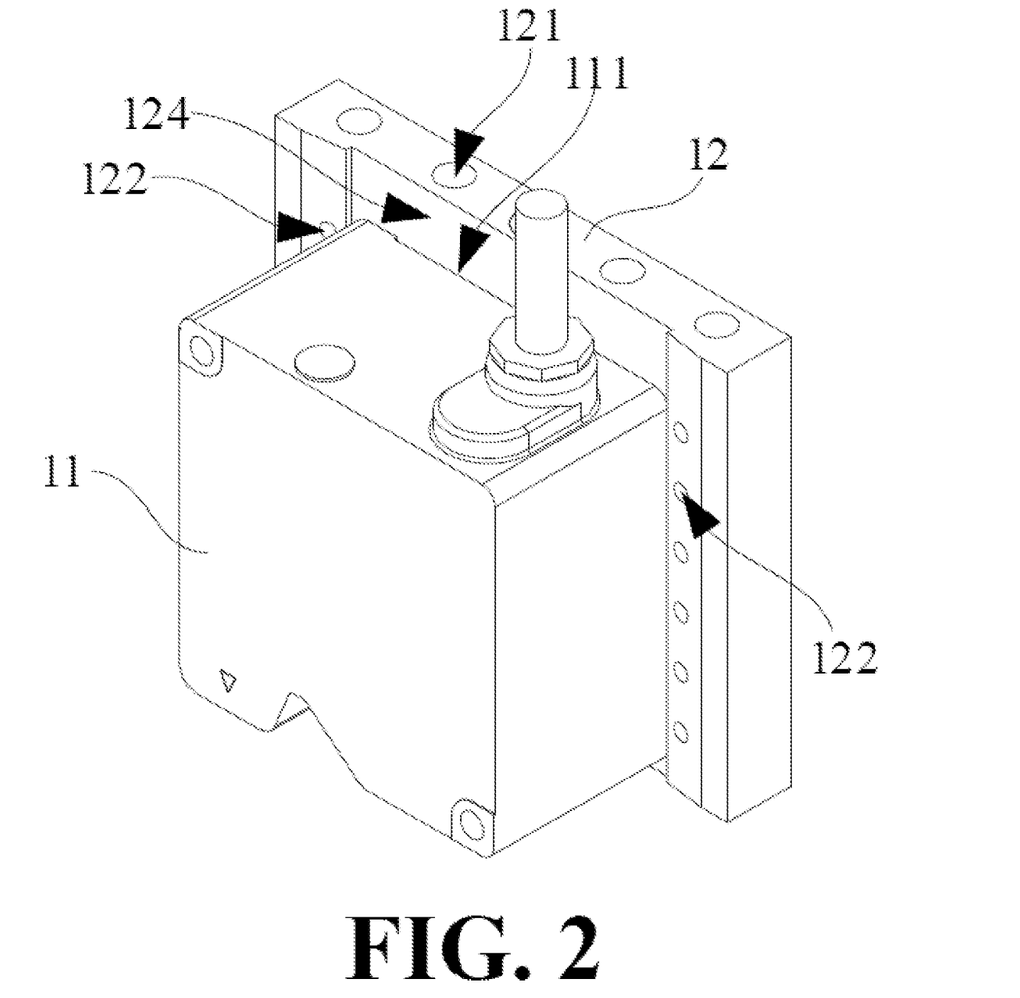
FIG. 2 is a schematic assembling structural diagram of a laser ranging sensor and a cooling plate provided in some embodiments of the present application.
Figure 3:
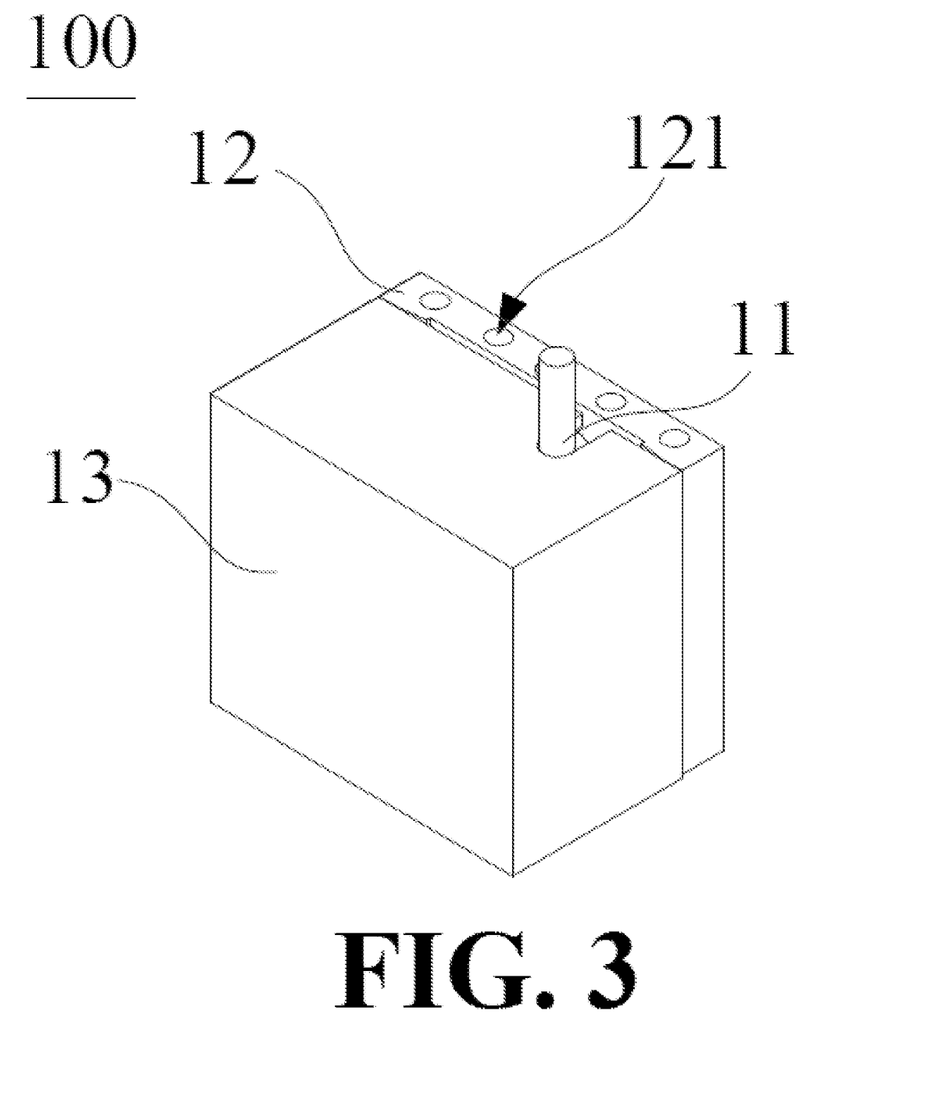
FIG. 3 is a schematic assembling structural diagram of a detection device provided in an embodiment of the present application.
Figure 4:
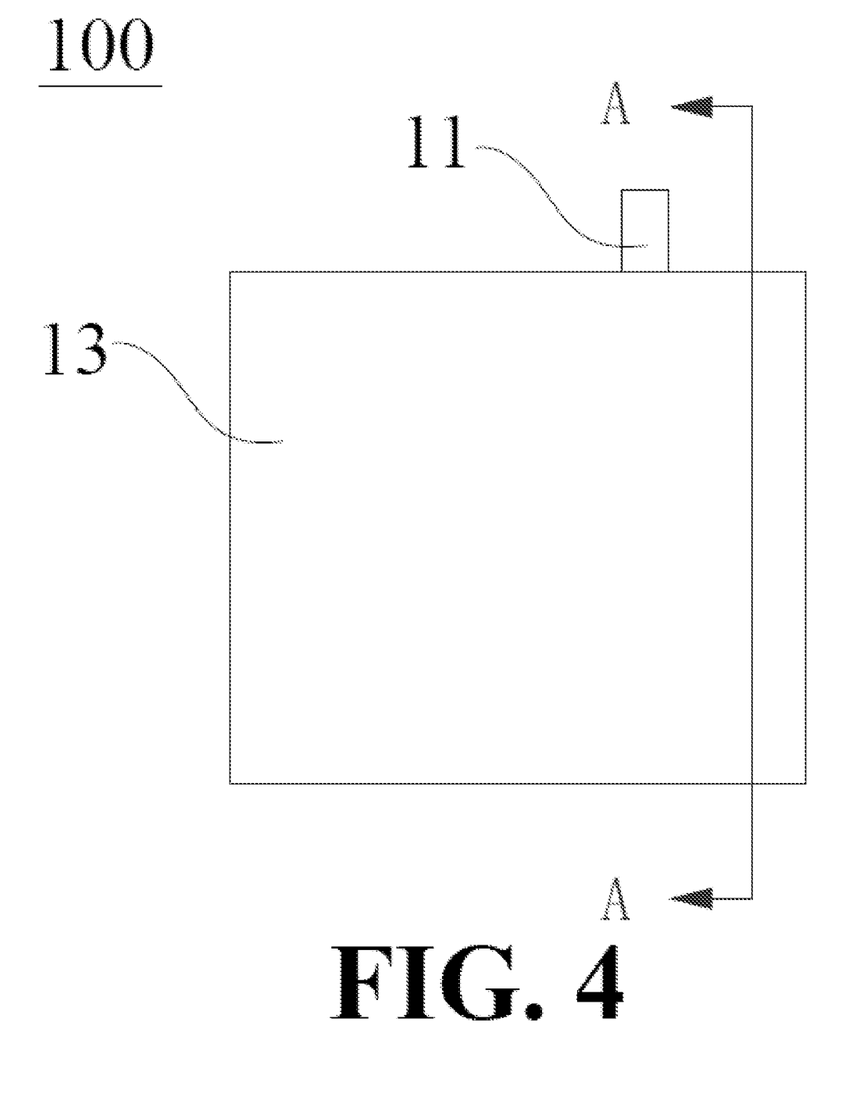
FIG. 4 is a schematic structural diagram of a detection device provided in an embodiment of the present application in one viewing angle.
Figure 5:
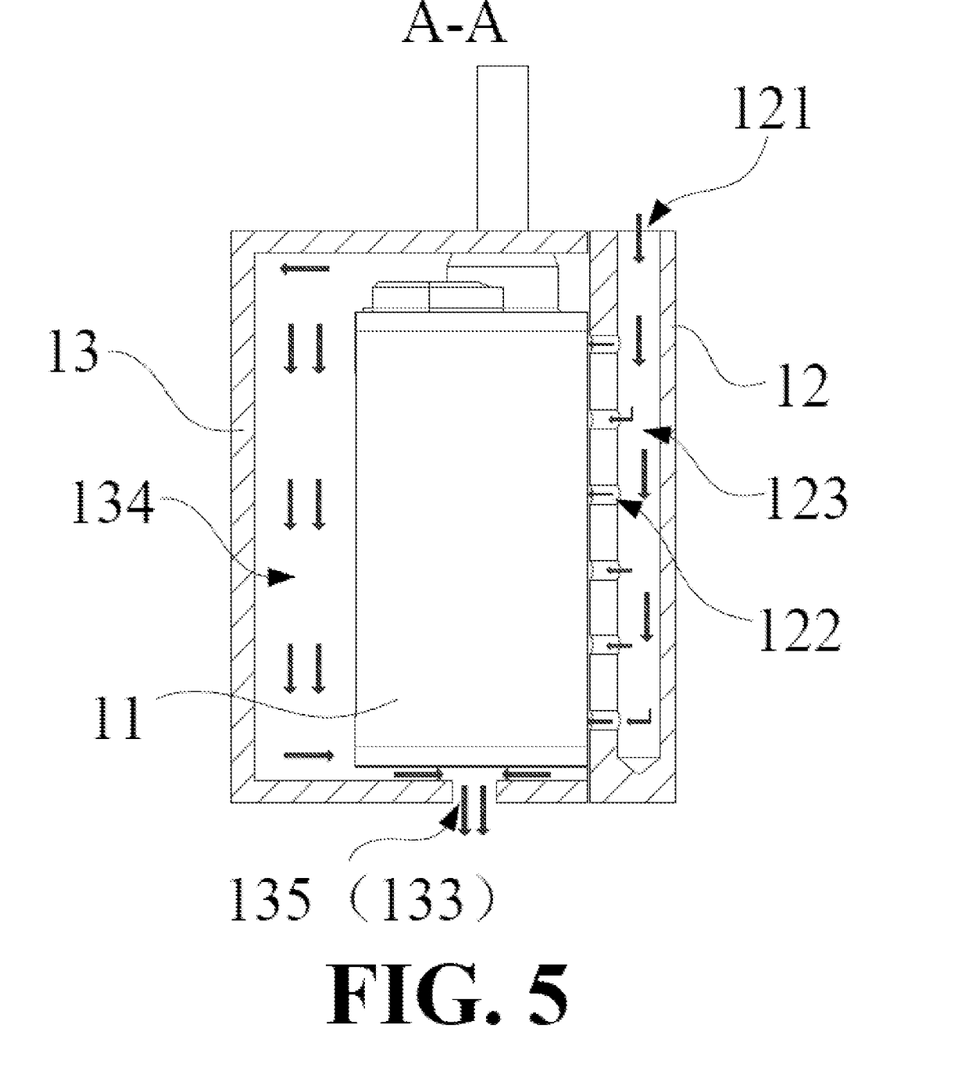
FIG. 5 is a schematic sectional structural diagram along direction A-A in FIG. 4.

Referring to FIG. 1 to FIG. 5, FIG. 1 is a schematic exploded structural diagram of a detection device 100 provided in some embodiments of the present application; FIG. 2 is a schematic assembling structural diagram of a laser ranging sensor and a cooling plate provided in some embodiments of the present application; FIG. 3 is a schematic assembling structural diagram of a detection device provided in an embodiment of the present application; FIG. 4 is a schematic structural diagram of a detection device provided in an embodiment of the present application in one viewing angle; and FIG. 5 is a schematic sectional structural diagram along direction A-A in FIG. 4. The detection device 100 provided in an embodiment of a first aspect of the present application includes a laser ranging sensor 11; and a cooling module, which includes a first protective enclosure 13 and a cooling plate 12. The first protective enclosure 13 encloses the outside of the laser ranging sensor 11. The first protective enclosure 13 is provided with an avoidance portion 135 for avoiding a laser light path of the laser ranging sensor 11. The first protective enclosure 13 has a first opening 131. The cooling plate 12 covers the first opening 131. An air flow channel 123 is defined inside the cooling plate 12. Surfaces of the cooling plate 12 are provided with air inlet holes 121 and first air outlet holes 122 which are communicated with the air flow channel 123. The first air outlet holes 122 are disposed in a manner of facing the laser ranging sensor 11 to blow air to the laser ranging sensor 11 to cool the laser ranging sensor 11.

The laser ranging sensor 11 can be configured for detecting a distance between the laser ranging sensor and an object to be detected (such as a pole piece 300) or detecting the thickness of the object to be detected. During the measurement of the thickness of the object to be detected, two laser ranging sensors 11 can be respectively arranged on two sides of the object to be detected in a thickness direction. After a distance L between the two laser ranging sensors 11 is determined, distances A and B between the two laser ranging sensors 11 and upper and lower surfaces of the object to be detected are then measured, so that the thickness of the object to be measured can be obtained. That is, the thickness of the object to be detected is T=L−A−B.

The cooling plate 12 has air inlet holes 121, an air flow channel 123 and air outlet holes. The air flow channel 123 is communicated with the air inlet holes 121 and the air outlet holes. Since the air outlet holes are disposed in a manner of facing the laser ranging sensor 11, when compressed air is introduced into the air inlet holes 121, the compressed air is blown to the laser ranging sensor 11 through the air flow channel 123 and the air outlet holes, thereby exchanging heat to the laser ranging sensor 11 and then achieving a cooling effect on the laser ranging sensor 11.

The first protective enclosure 13 can be a heat shield. On the one hand, the compressed air can form a vortex effect when flowing in the first protective enclosure 13 to cool all surfaces of the laser ranging sensor 11. On the other hand, external hot air can be prevented from entering the first protective enclosure 13.

An avoidance portion 135 is arranged on the first protective enclosure 13 and is configured for avoiding a laser light path of the laser ranging sensor 11. In some embodiments, the avoidance portion 135 is located at a position of the first protective enclosure 13 corresponding to the laser light path of the laser ranging sensor 11 and is made of a transparent material, so that the laser light path of the laser ranging sensor 11 can irradiate the object to be detected through the transparent material. In some embodiments, the avoidance portion 135 is a through hole formed by hollowing out a position of the first protective enclosure 13 corresponding to the laser light path of the laser ranging sensor 11, so that the laser light path of the laser ranging sensor 11 can irradiate the object to be detected through the through hole.

The first protective enclosure 13 encloses the outside of the laser ranging sensor 11, and the cooling plate 12 covers the first opening 131 of the first protective enclosure 13, so that the laser ranging sensor 11 is located between the first protective enclosure 13 and the cooling plate 12. Specifically, the air flow channel 123 is defined inside the cooling plate 12, and surfaces of the cooling plate 12 are provided with the air inlet holes 121 and the first air outlet holes 122 which are communicated with the air flow channel 123; and the first air outlet holes 122 are disposed in a manner of facing the laser ranging sensor 11. In this way, when the compressed air is introduced into the air inlet holes 121, the compressed air can be blown from the air outlet holes to the laser ranging sensor 11 after passing through the air flow channel 123. By means of exchanging heat with hot air in an environment where the laser ranging sensor 11 is located, the compressed air achieves the purpose of cooling the laser ranging sensor 11. Thus, it helps to improve the detection accuracy of the laser ranging sensor 11, and prolongs the service life of the laser ranging sensor 11.

Referring to FIG. 1 and FIG. 2, according to some embodiments of the present application, the cooling plate 12 includes a first surface and a second surface which are disposed adjacently. The first surface is disposed in a manner of facing the laser ranging sensor 11. The first air outlet holes 122 are formed in the first surface; and the air inlet holes 121 are formed in the second surface.

The first surface and the second surface of the cooling plate 12 are arranged adjacently, and the first surface faces the laser ranging sensor 11. The first air outlet holes 122 and the air inlet holes 121 are respectively formed in the first surface and the second surface. That is, the second surface can be any one of four surfaces adjacent to the first surface. That is, the air inlet holes 121 are formed in any one of the four surfaces adjacent to the first surface.

By means of forming the first air outlet holes 122 and the air inlet holes 121 on the first surface and the second surface respectively, an extension length of the air flow channel 123 can be appropriately increased, which helps to improve the cooling effect of the compressed air on the cooling plate itself and in turn contributes to the cooling effect on the laser ranging sensor.

According to some embodiments of the present application, there are multiple air flow channels 123. The multiple air flow channels 123 are arranged at intervals inside the cooling plate 12.

The air flow channel 123 is a passage for air to circulate in the cooling plate 12.

By means of arranging the multiple air flow channels 123 at intervals inside the cooling plate 12, the number of the air flow channel 123 is increased, thereby increasing a flow area of the compressed air in the cooling plate 12, which in turn helps to improve the cooling effect on the laser ranging sensor 11.

Specifically, there are also multiple air inlet holes 121. The multiple air inlet holes 121 are arranged at intervals on the second surface and are communicated with the multiple air flow channels 123 in a one-to-one correspondence manner.

Referring to FIG. 1, according to some embodiments of the present application, each of the air flow channels 123 has multiple first air outlet holes 122 arranged at intervals along an extending direction of the air flow channel 123.

The air inlet holes 121 are formed in the second surface of the cooling plate 12, and one end of the air flow channel 123 is communicated with the air inlet holes 121, that is, the air flow channel 123 extends away from the second surface.

By means of arranging the multiple first air outlet holes 122 at intervals along the extending direction of each of the air flow channels 123, the volume of the compressed air blown to the laser ranging sensor 11 at the same time can be increased, so as to effectively improve the heat exchange efficiency with hot air surrounding the laser ranging sensor 11, which can in turn improve the cooling effect on the laser ranging sensor 11.

Referring to FIG. 2, according to some embodiments of the present application, a side of the cooling plate 12 facing the laser ranging sensor 11 is provided with a position-limit slot 124, and part of the laser ranging sensor 11 is embedded in the position-limit slot 124 and is fixedly connected with the cooling plate 12.

The position-limit slot 124 is a slot formed by the first surface of the cooling plate 12 that is partially recessed, and is configured for fixing the laser ranging sensor 11.

By means of arranging the position-limit slot 124 on the side of the cooling plate 12 facing the laser ranging sensor 11, part of the laser ranging sensor 11 is embedded in the position-limit slot 124 and is fixedly connected with the cooling plate 12. The position-limit slot 124 has a limiting effect on the laser ranging sensor 11, which prevents a relative movement of the laser ranging sensor 11 from the cooling plate 12, improves the reliability of assembling of the laser ranging sensor 11 and the cooling plate 12, and helps to improve the detection accuracy of the laser ranging sensor 11.

According to some embodiments of the present application, there is a first space 111 between the laser ranging sensor 11 and the bottom wall of the position-limit slot 124, and two side walls of the position-limit slot 124 are provided with the first air outlet holes 122.

The first space 111 is a space for air to flow between the first protective enclosure and the laser ranging sensor.

By means of defining the first space 111 between the side of the laser ranging sensor 11 facing the cooling plate 12 and the bottom wall of the position-limit slot 124, it can be ensured that the compressed air can be blown out from the first space 111 while it is blown out from the first air outlet holes 122 to the laser ranging sensor 11, which ensures the smoothness of air flowing, and in turn ensures that the compressed air can be continuously blown out from the first air outlet holes 122 to continuously cool the laser ranging sensor 11. At the same time, since the two side walls of the position-limit slot 124 are provided with the first air outlet holes, in this way, when part of the laser ranging sensor 11 is embedded in the position-limit slot 124, the first air outlet holes 122 on the two side walls of two sides of the position-limit slot 124 can synchronously blow air to two side surfaces of the laser ranging sensor 11, so as to further improve the cooling efficiency for the laser ranging sensor 11.

Referring to FIG. 1, according to some embodiments of the present application, the first protective enclosure 13 is provided with a second opening 132, and the second opening 132 is configured for connecting the laser ranging sensor 11 with external equipment.

The second opening 132 is an avoidance opening, which is configured for avoiding part of the structure of the laser ranging sensor 11, so that the laser ranging sensor 11 can be connected with the external equipment.

By means of forming the second opening 132 in the first protective enclosure 13, it can be ensured that a connecting end of a laser emitting end of the laser ranging sensor 11 is connected to the external equipment (such as a power supply device), which ensures the normal use of the laser ranging sensor 11.

Referring to FIG. 4 and FIG. 5, FIG. 4 is a schematic structural diagram of a detection device provided in an embodiment of the present application in one viewing angle; and FIG. 5 is a schematic sectional structural diagram along direction A-A in FIG. 4. According to some embodiments of the present application, the first protective enclosure 13 is provided with an air outlet 133.

The air outlet 133 is formed in a side of the first protective enclosure 13 away from the second opening 132, and is used for air in the first protective enclosure 13 to flow out.

The first protective enclosure 13 is provided with the air outlet 133. In this way, after the compressed air in the cooling plate 12 exchanges heat with the hot air surrounding the laser ranging sensor 11, the compressed air can be quickly discharged out of the first protective enclosure 13 from the air outlet 133, so as to ensure that the compressed air cyclically cools the laser ranging sensor 11 in the first protective enclosure 13, thereby helping to further improve the cooling efficiency of the laser ranging sensor 11.

In some embodiments, the air outlet 133 and the avoidance portion 135 are the same, so that the first protective enclosure 13 is simple in structure and convenient to manufacture. That is, the position of the laser emitting end of the laser ranging sensor 11 corresponds to the position of the air outlet 133, and the laser emitting end of the laser ranging sensor 11 can emit laser light out of the first protective enclosure 13 from the air outlet 133, thereby achieving ranging on the object to be detected. It should be noted that the air outlet 133 and the avoidance portion 135 may also be different components on the first protective enclosure 13, which is not limited in this embodiment of the present application.

It can be understood that the compressed air blown out from the first air outlet hole s122 can also be discharged from the second opening 132 after exchanging heat with the hot air surrounding the laser ranging sensor 11.

Referring to FIG. 5, according to some embodiments of the present application, a second space 134 for air to flow is formed between the inner wall surface of the first protective enclosure 13 and the laser ranging sensor 11.

An inner surface of the first protective enclosure 13 is a surface of the first protective enclosure 13 facing the laser ranging sensor 11.

The second space 134 is arranged between the laser ranging sensor 11 and the inner wall surface of the first protective enclosure 13, so that the compressed air can form a vortex effect in the first protective enclosure 13 after being blown from the first air outlet holes to the laser ranging sensor 11, which can cool all the surfaces of the laser ranging sensor 11 and in turn further improve the cooling effect on the laser ranging sensor 11. Specifically, the side of the cooling plate 12 facing the laser ranging sensor 11 is provided with the position-limit slot 124; the first space 111 is arranged between the laser ranging sensor 11 and the bottom wall of the position-limit slot 124; and the two side walls of the position-limit slot 124 are provided with the first air outlet holes 122. When the compressed air is blown from the first air outlet holes 122 on the bottom wall of the position-limit slot 124 to the laser ranging sensor 11, the compressed air can flow to two opposite sides of the first protective enclosure 13 through the first space 111 along a lengthwise direction of the position-limit slot 124, and be blow out from the air outlet 133 along the inner wall surface of the first protective enclosure 13. Meanwhile, the compressed air is blow to the two side surfaces of the laser ranging sensor 11 through the first air outlet holes 122 on the two side walls of the position-limit slot 124, and is blown out from the air outlet 133 along the inner wall surface of the first protective enclosure 13. The air in multiple directions flows in the first protective enclosure 13 along different directions, thereby forming the vortex effect in the first protective enclosure 13 to greatly improve the cooling effect on the laser ranging sensor 11.

According to some embodiments of the present application, the detection device 100 further includes: a fixing plate (not shown in the figure), which is fixedly connected with the cooling plate 12 and/or the first protective enclosure 13 and is configured for fixing the cooling plate 12 and/or the first protective enclosure 13.

Specifically, one side of the fixing plate is fixedly connected with the cooling plate 12 and the first protective enclosure 13 respectively, and the other side is used to be fixedly connected with a scanning frame 202 on pole piece manufacturing equipment 200.

According to some embodiments of the present application, the detection device 100 further includes: a second protective enclosure (not shown in the figure), which encloses the outside of the laser ranging sensor 11 and the cooling module. A side of the cooling plate 12 facing away from the laser ranging sensor 11 is provided with second air outlet holes (not shown in the figure). the second air outlet holes are communicated with the air flow channel 123, and a third space for air to flow is formed between the inner wall surface of the second protective enclosure and the cooling module.

The second protective enclosure is a protective enclosure arranged outside the laser ranging sensor 11 and the cooling module.

The side of the cooling plate 12 facing away from the laser ranging sensor 11 is provided with the second air outlet hole communicated with the air flow channel 123; the second protective enclosure is arranged outside the laser ranging sensor 11 and the cooling module; and the third space is arranged between the inner wall surface of the second protective enclosure and the cooling module. In this way, when the compressed air is blown from the second air outlet hole to the inner wall surface of the second protective enclosure, a vortex effect can be formed in the second protective enclosure, so as to cool the cooling module, thereby further improving the cooling effect on the laser ranging sensor 11.

Figure 6:
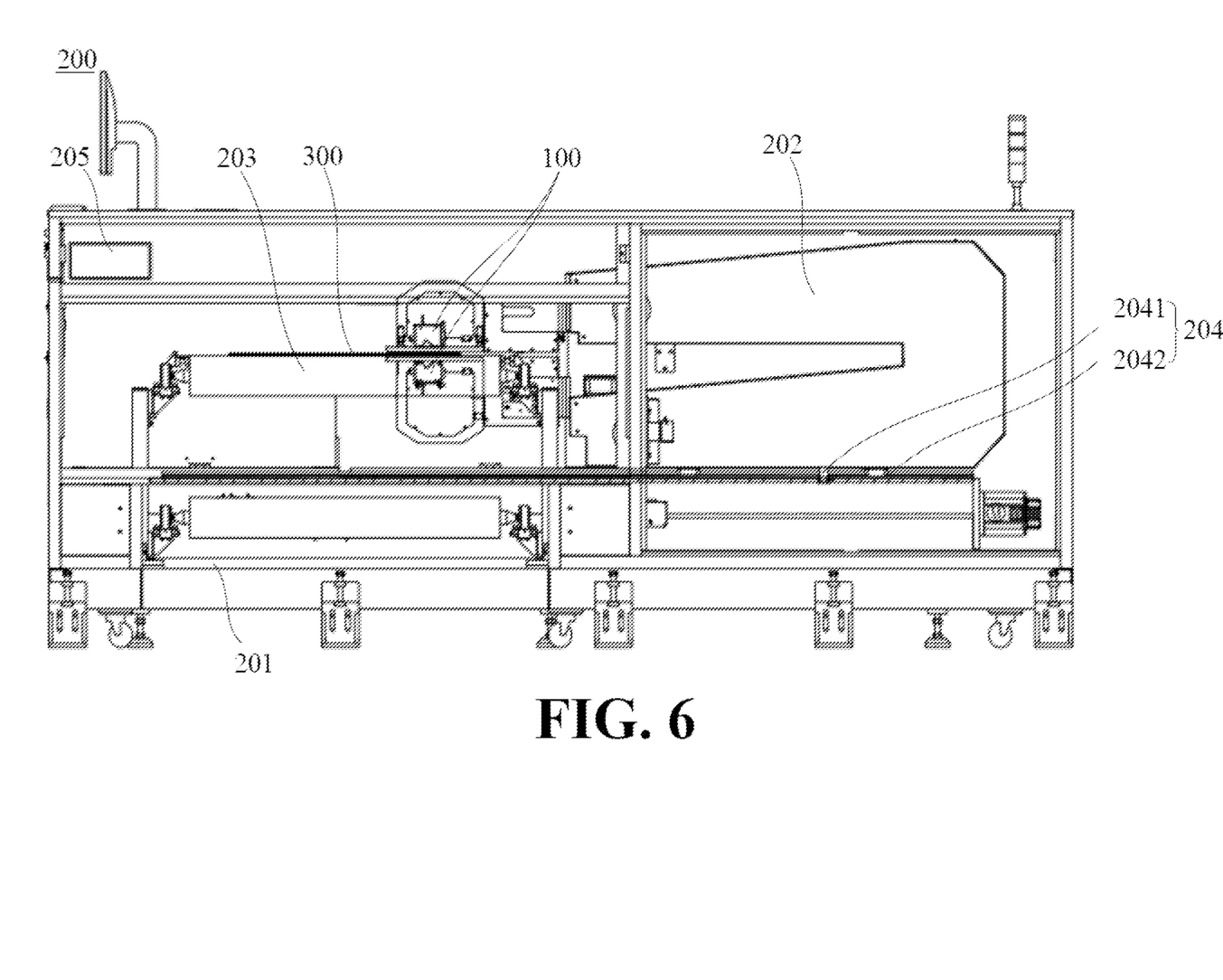
FIG. 6 is a schematic structural diagram of pole piece manufacturing equipment provided in an embodiment of the present application in one viewing angle.

Referring to FIG. 6, FIG. 6 is a schematic structural diagram of pole piece manufacturing equipment provided in an embodiment of the present application in one viewing angle. An embodiment of a second aspect of the present application provides pole piece manufacturing equipment 200, including: a coating device (not shown in the figure) configured for coating a surface of a pole piece 300; the detection device 100 according to any one of the embodiments of the first aspect, where the number of the detection devices 100 is two, and the two detection devices 100 are respectively arranged on two sides of the pole piece 300 along the thickness direction and are configured for detecting the thickness of the pole piece 300; and a controller 205, which is configured for receiving the thickness of the pole piece 300 detected by the detection devices 100 and controlling, according to a comparison result between the thickness of the pole piece 300 and a preset thickness threshold, the coating device to adjust the thickness of the pole piece 300.

The coating device is configured for coating the surface of the pole piece 300.

Specifically, the coating device is provided with a coating head, and two sides of the coating head are provided with thinning pieces. The coating head is configured for coating the pole piece, and the thinning pieces are configured for thinning the pole piece.

The detection devices 100 are arranged on the two sides of the pole piece 300 along the thickness direction to detect the thickness of the pole piece 300. The controller 205 (such as an industrial personal computer) is electrically connected with the detection devices 100 and the coating device, and is configured for receiving the thickness of the pole piece 300 detected by the detection devices 100, comparing the thickness of the pole piece 300 with the preset thickness threshold, and controlling, according to the comparison result, the coating device to adjust the thickness of the pole piece 300. If the thickness of the pole piece 300 detected by the detection devices 100 is less than or greater than the preset thickness threshold, the controller 205 controls the coating device to coat or thin the pole piece 300 to make the thickness of the pole piece 300 to reach the preset threshold.

Specifically, the detection devices 100 are arranged on the two sides of the pole piece 300 along the thickness direction.

According to some embodiments of the present application, the thickness of the pole piece 300 includes a thickness of a thinned region of the pole piece 300.

The thickness of the thinned region of the pole piece 300 is a thickness of each of two side edges of the pole piece 300 in the width direction.

When the thinned region of the pole piece 300 of a lithium battery is relatively wide during coating production, the coating amount of slurry of the pole piece 300 is less than that of a normal region, which leads to a decrease in a battery capacity of the lithium battery, resulting in a decrease in the safety of a cell. When the thinned region of the pole piece 300 is too narrow or there is no thinned region, a problem of bulging will occur. Therefore, by means of real-time online measurement and monitoring of the thickness of the thinned region of the pole piece 300, the battery capacity of the lithium battery can be effectively guaranteed, and the safety of use of the lithium battery is guaranteed.

According to some embodiments of the present application, the pole piece manufacturing equipment 200 further includes: an oven drying device, which is arranged downstream of the coating device and is configured for oven-drying the pole piece 300; and a rolling device 203, which is arranged downstream of the oven drying device and is configured for rolling the pole piece 300, where the detection devices 100 are arranged upstream of the rolling device 203.

The oven drying device is arranged downstream of the coating device, and is configured for oven-drying the pole piece 300 after the coating device is used to coat the pole piece 300. The rolling device 203 is arranged downstream of the drying device, and is configured for rolling the pole piece 300 after the oven drying device dries the pole piece 300.

The thickness of the pole piece 300 rolled by the rolling device 203 is a real-time thickness of the pole piece 300 in an offline coating process. The thickness of the pole piece 300 during the coating cannot be adjusted in real time, and there is a risk of batch scrapping of pole pieces due to overspecification caused by lagging detection of the thickness of the pole piece 300. Therefore, the detection devices 100 are arranged upstream of the rolling device 203, that is, no matter the detection devices 100 are arranged between the oven drying device and the rolling device 203 or arranged upstream of the oven drying device, the thickness of the pole piece 300 can be detected in real time after the coating device is used to coat the pole piece 300, and is adjusted in real time by the coating device, thus ensuring the reliability of the quality of the pole piece 300.

Referring to FIG. 6, according to some embodiments of the present application, the pole piece manufacturing equipment 200 further includes: a base 201; a scanning frame 202, which is arranged on the base 201 and slidably connected with the base 201, where the detection devices 100 are arranged on the scanning frame 202; a magnetoscale assembly 204, which includes a magnetoscale 2041 arranged on the base 201 and a magnetoscale reading head 2042 arranged on the scanning frame 202, and the magnetoscale reading head 2042 is configured for reading, when the scanning frame 202 slides relative to the base 201, equally spaced magnetic waves pre-recorded on the magnetoscale 2041, so as to detect a linear displacement of the scanning frame 202.

The base 201 is configured for fixing the scanning frame 202, the rolling device 203 and other device components. Exemplarily, the scanning frame 202 is a C-shaped scanning frame 202.

The scanning frame 202 is arranged on the base 201 and is slidably connected with the base 201. The detection devices 100 are arranged on the scanning frame 202, and the scanning frame 202 can drive the detection devices 100 to reciprocate to detect the thickness of the pole piece 300. The magnetoscale assembly 204 includes the magnetoscale 2041 on the base 201 and the magnetoscale reading head 2042 arranged on the scanning frame 202. When the scanning frame 202 slides in a reciprocating manner relative to the base 201 to drive the detection devices 100 to move, the magnetoscale reading head 2042 reads the equally spaced magnetic waves pre-recorded on the magnetoscale 2041, so as to detect the linear displacement of the scanning frame 202. A deviation in an edge finding position of a scanning chamber of the scanning frame 202 caused by low accuracy of a mechanical transmission member is avoided, and the edge finding accuracy of forward and backward scanning of the laser ranging sensor 11 when the scanning frame 202 reciprocates is improved, thereby improving the linear measurement accuracy.

Figure 7:
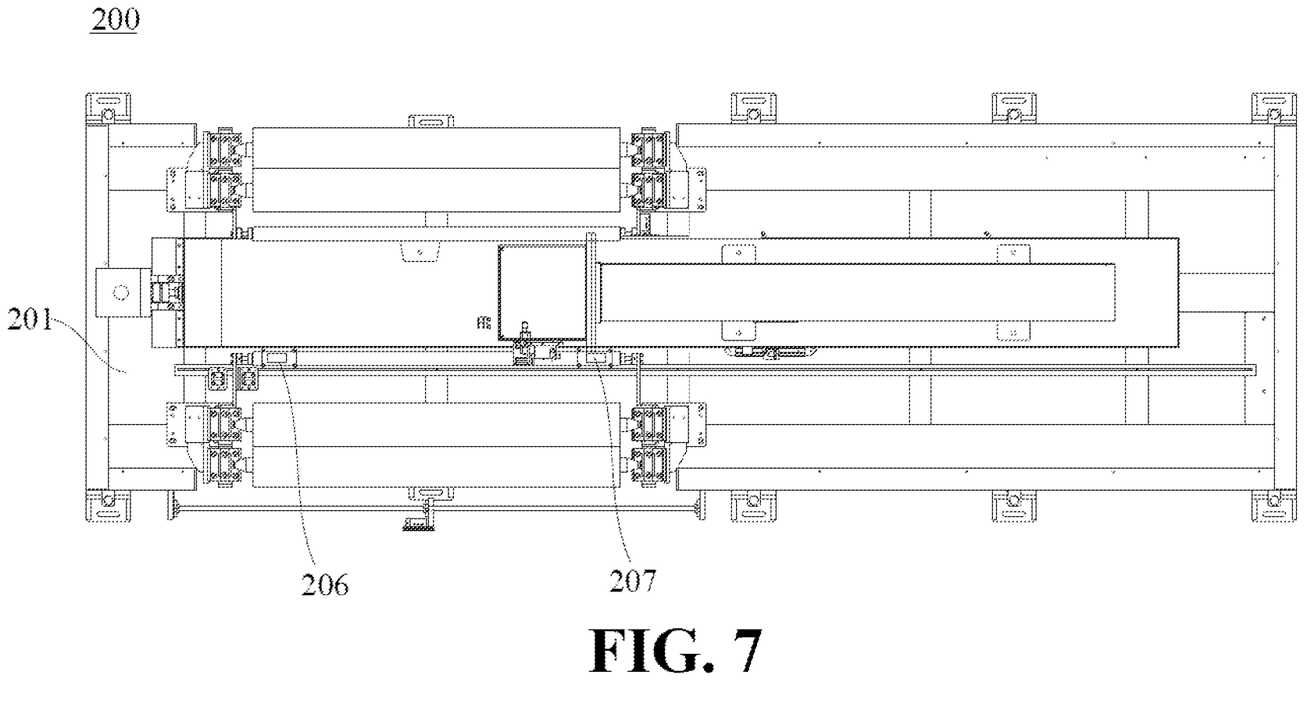
FIG. 7 is a schematic structural diagram of pole piece manufacturing equipment provided in an embodiment of the present application in another viewing angle.
Figure 8:
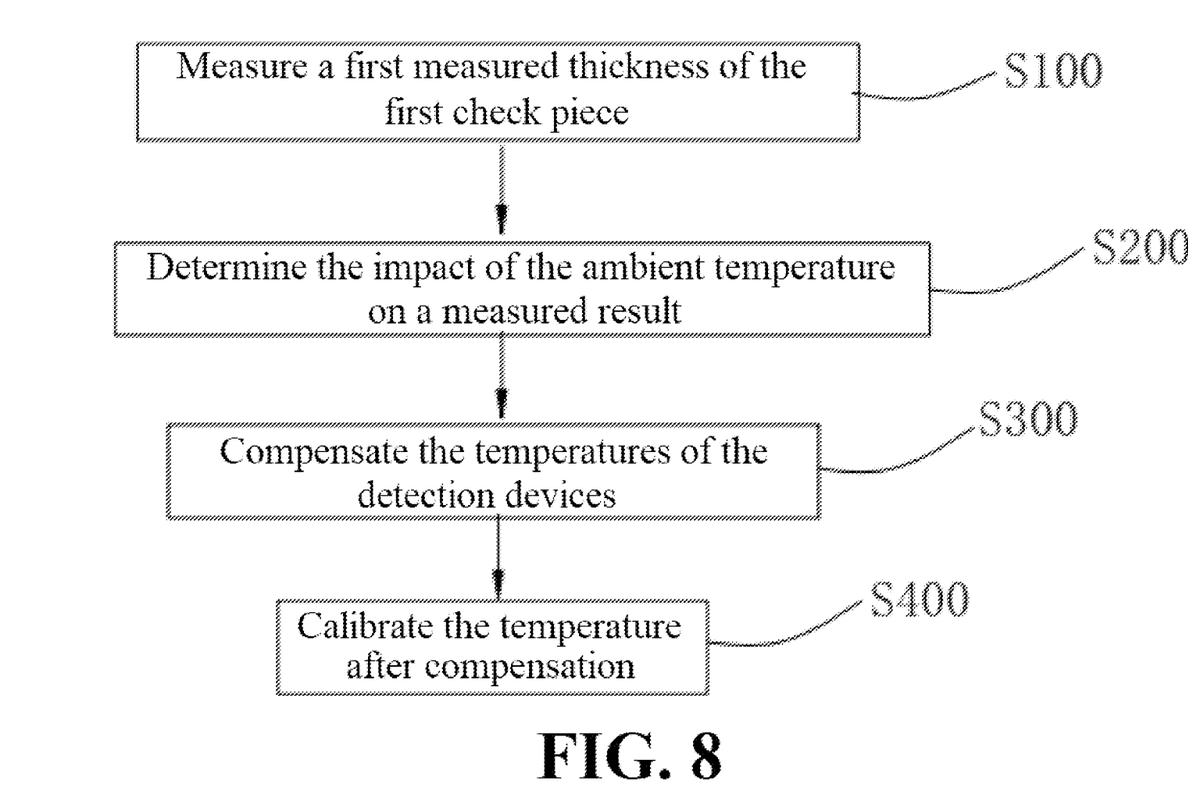
FIG. 8 is a work flowchart of a first check piece and a second check piece in some embodiments of the present application.

Referring to FIG. 7 and FIG. 8, FIG. 7 is a schematic structural diagram of pole piece manufacturing equipment provided in an embodiment of the present application in another viewing angle; and FIG. 8 is a work flowchart of a first check piece and a second check piece in some embodiments of the present application. According to some embodiments of the present application, the pole piece manufacturing equipment 200 further includes a first check piece 206 and a second check piece. The first check piece 206 and the second check piece 207 are arranged on the base 201 and are respectively located on two sides of the pole piece 300 in the width direction. One of the first check piece 206 and the second check piece 207 is configured for compensating the temperature of the pole piece 300, and the other one is configured for calibrating the temperature after compensation.

Since changes in the ambient temperature will affect the measurement accuracy of the detection devices 100, generally, if the ambient temperature is high, the thickness value of the object to be detected measured by the detection devices 100 is larger. Therefore, it is necessary to compensate the temperatures of the detection devices 100, so as to improve the measurement accuracy of the detection devices 100. The first check piece 206 and the second check piece 207 are connected by a half-bridge, and the first check piece 206 and the second check piece 207 are respectively located on the two sides of the pole piece 300 in the width direction. One of the first check piece 206 and the second check piece 207 can compensate the temperature of the pole piece 300, and the other one can calibrate the temperature after compensation, thereby avoiding the impact of the temperature on the detection of the thickness of the pole piece 300, which helps to improve the accuracy of detection of the thickness of the pole piece 300.

For the convenience of description, the first check piece 206 is configured for compensating the temperature of the pole piece 300, and the second check piece 207 is configured for calibrating the temperature after compensation, which will be described below as an example. The first check piece 206 and the second check piece 207 have a first standard thickness and a second standard thickness. As shown in FIG. 8, the work flow of the first check piece 206 and the second check piece 207 is as follows:

S100: a first measured thickness of the first check piece 206 is measured. The detection devices 100 are used to detect the first measured thickness of the first check piece 206.

S200: the impact of the ambient temperature on a measured result is judged. By means of comparing the first measured thickness with the first standard thickness, the impact of the ambient temperature of the pole piece 300 on a thickness detection result of the pole piece 300 can be obtained.

S300: the temperatures of the detection devices 100 are compensated. The temperatures of the detection devices 100 are compensated according to a deviation between the first measured thickness and the first standard thickness.

S400: the temperature after compensation is calibrated. The detection devices 100 subjected to the temperature compensation is used to detect a second measured thickness of the second check piece 207, and the accuracy of the temperature after compensation is judged according to a deviation between the second measured thickness and the second standard thickness.

The first standard thickness and the second standard thickness may be the same or different, which is not limited in this embodiment of the present application. The first check piece 206 and the second check piece 207 can be made of stainless steel, tungsten steel and other materials that are less affected by the environment, so as to avoid the impact of environmental factors such as humidity on the temperature compensation of the detection devices 100.

According to some embodiments of the present application, referring to FIG. 1 to FIG. 5, the present application provides a detection device 100, including a laser ranging sensor 11, a first protective enclosure 13, a cooling plate 12 and a second protective enclosure. The first protective enclosure 13 encloses the outside of the laser ranging sensor 11. The first protective enclosure 13 has a first opening 131. The cooling plate 12 covers the first opening 131. An air flow channel 123 is defined inside the cooling plate 12. Surfaces of the cooling plate 12 are provided with air inlet holes 121 and first air outlet holes 122 which are communicated with the air flow channel 123. The first air outlet holes 122 are disposed in a manner of facing the laser ranging sensor 11 to blow air to the laser ranging sensor 11 to cool the laser ranging sensor 11. The second protective enclosure encloses the outside of the first protective enclosure 13 and the cooling plate 12, and the second air outlet is arranged on the side of the cooling plate 12 facing away from the laser ranging sensor 11 and is communicated with the air flow channel 123.

Further, there are multiple air inlet holes 121. The multiple air inlet holes 121 are arranged on the second surface at intervals. There are multiple air flow channels 123. The multiple air flow channels 123 are communicated with the multiple air inlet holes 121 in a one-to-one correspondence manner. Multiple first air outlet holes 122 and multiple second air outlet holes are configured in an extending direction of each of the air flow channels 123. By means of introducing compressed air to the air inlet holes 121, the compressed air is blown from the first air outlet holes 122 along the air flow channels 123 to the laser ranging sensor 11 and an inner surface of the first protective enclosure 13 to cool the laser ranging sensor 11, so as to improve the detection accuracy of the laser ranging sensor 11 and the service life of the laser ranging sensor. At the same time, the compressed air flows to the inner surface of the second protective enclosure through the second air outlet holes, thereby cooling the cooling plate 12 and the first protective enclosure 13 to further improve the cooling effect on the laser ranging sensor 11.

Although the present application has been described with reference to the embodiments, various improvements can be made thereto and components thereof can be replaced with equivalents without departing from the scope of the present application. In particular, the technical features mentioned in the various embodiments can be combined in any manner as long as there is no structural conflict. The present application is not limited to the specific embodiments disclosed herein, but includes all technical solutions falling within the scope of the claims.

The invention claimed is:

1. A detection device, comprising:
a laser ranging sensor; and
a cooling module, which comprises a first protective enclosure and a cooling plate, wherein the first protective enclosure encloses an outside of the laser ranging sensor; the first protective enclosure is provided with an avoidance portion for avoiding a laser light path of the laser ranging sensor; the first protective enclosure has a first opening covered by the cooling plate; an air flow channel is defined inside the cooling plate; surfaces of the cooling plate are provided with air inlet holes and first air outlet holes which are communicated with the air flow channel; and the first air outlet holes are disposed in a first surface of the cooling plate facing the laser ranging sensor to blow air through the first air outlet holes toward the laser ranging sensor to cool the laser ranging sensor, wherein the air flow channel extends inside the cooling plate in a direction parallel to the first surface of the cooling plate, the air inlet holes extend in a first direction, the first air outlet holes extend in a second direction, and the first direction is perpendicular to the second direction.

2. The detection device according to claim 1, wherein the cooling plate comprises a second surface which is disposed adjacently to the first surface; and the air inlet holes are formed in the second surface.

3. The detection device according to claim 1, wherein there are multiple separate air flow channels, which are arranged at intervals inside the cooling plate.

4. The detection device according to claim 1, wherein the air flow channel has multiple first air outlet holes arranged at intervals along an extending direction of the air flow channel.

5. The detection device according to claim 1, wherein a side of the cooling plate facing the laser ranging sensor is provided with a position-limit slot, and part of the laser ranging sensor is embedded in the position-limit slot and is fixedly connected with the cooling plate.

6. The detection device according to claim 5, wherein there is a first space between the laser ranging sensor and a bottom wall of the position-limit slot, and two side walls of the position-limit slot are provided with the first air outlet holes.

7. The detection device according to claim 1, wherein the first protective enclosure is provided with a second opening, and the second opening is configured for connecting the laser ranging sensor with external equipment.

8. The detection device according to claim 1, wherein the first protective enclosure is provided with an air outlet.

9. The detection device according to claim 1, wherein a second space for air to flow is formed between an inner wall surface of the first protective enclosure and the laser ranging sensor.

10. The detection device according to claim 1, wherein the detection device further comprises:
a second protective enclosure, which encloses the outside of the laser ranging sensor and the cooling module;
a side of the cooling plate facing away from the laser ranging sensor is provided with second air outlet holes; the second air outlet holes are communicated with the air flow channel, and a third space for air to flow is formed between an inner wall surface of the second protective enclosure and the cooling module.

11. Pole piece manufacturing equipment, comprising:
a coating device, which is configured for coating a surface of a pole piece;
the detection device according to claim 1, wherein a number of the detection devices is two, and the two detection devices are respectively arranged on two sides of the pole piece along a thickness direction and are configured for detecting a thickness of the pole piece; and
a controller, which is configured for receiving the thickness of the pole piece detected by the detection devices and controlling, according to a comparison result between the thickness of the pole piece and a preset thickness threshold, the coating device to adjust the thickness of the pole piece.

12. The pole piece manufacturing equipment according to claim 11, wherein the thickness of the pole piece comprises a thickness of a thinned region of the pole piece.

13. The pole piece manufacturing equipment according to claim 11, wherein the pole piece manufacturing equipment further comprises:
an oven drying device, which is arranged downstream of the coating device and is configured for oven-drying the pole piece; and
a rolling device, which is arranged downstream of the oven drying device and is configured for rolling the pole piece;
wherein the detection devices are arranged upstream of the rolling device.

14. The pole piece manufacturing equipment according to claim 11, wherein the pole piece manufacturing equipment further comprises:
a base;
a scanning frame, which is arranged on the base and slidably connected with the base, wherein the detection devices are arranged on the scanning frame; and
a magnetoscale assembly, which comprises a magnetoscale arranged on the base and a magnetoscale reading head arranged on the scanning frame, wherein the magnetoscale reading head is configured for reading, when the scanning frame slides relative to the base, equally spaced magnetic waves pre-recorded on the magnetoscale, so as to detect a linear displacement of the scanning frame.

15. The pole piece manufacturing equipment according to claim 11, wherein the pole piece manufacturing equipment further comprises a first check piece and a second check piece; the first check piece and the second check piece are arranged on the base and are respectively located on two sides of the pole piece in a width direction; one of the first check piece and the second check piece is configured for compensating a temperature of the pole piece, and another of the first check piece and the second check piece is configured for calibrating a temperature after compensation.

* * * * *